J. L. FOUNTAIN.
Wheel-Cultivator.
No. 54,139.
Patented Apr 24, 1866.
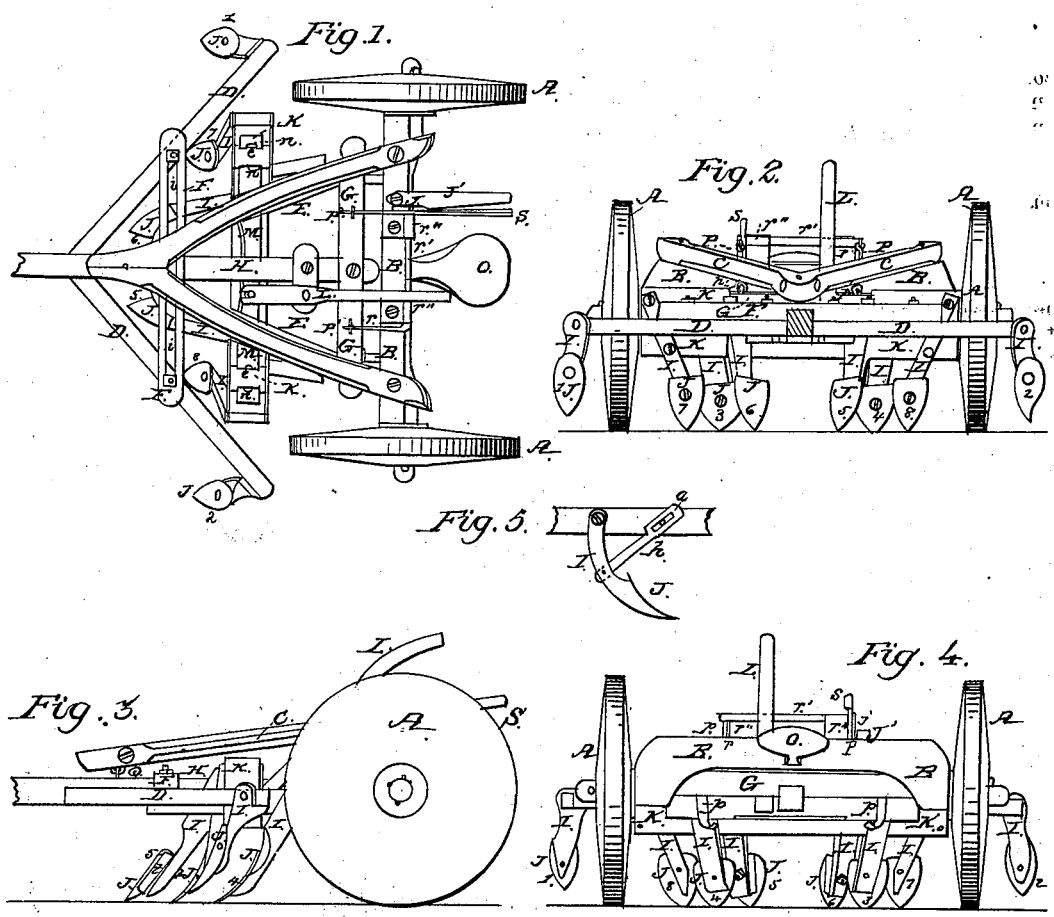

UNITED STATES PATENT OFFICE.

J. L. FOUNTAIN, OF NEW MILFORD, ILLINOIS.

IMPROVEMENT IN COMBINED SEEDER AND CULTIVATOR.

Specification forming part of Letters Patent No. 54,139, dated April 24, 1866.

*To all whom it may concern:*

Be it known that I, J. L. FOUNTAIN, of New Milford, in the county of Winnebago and State of Illinois, have invented certain new and useful Improvements in a Combined Cultivator, Corn-Marker, and Planter; and I do hereby declare that the following is a full and complete description of the construction and operation of the same, reference being had to the accompanying drawings, making a part of this specification, in which—

Figure 1 is a plan view. Fig. 2 is a front view. Fig. 3 is a side view. Fig. 4 is a view of the rear end. Fig. 5 is a detached section.

Like letters of reference refer to like parts in the different views.

A A, Fig. 1, are wheels placed upon the ends of an axle-tree, B. C C are hounds, the open ends of which are bolted to the top of the axle-tree, while the closed or joined ends project forward to the front of the machine, and to the under side of which the frame, shovels, and seeding-boxes are suspended. D D and E E, with cross-pieces F G and the center-piece H, constitute the frame to which the shovels and seed-boxes are attached.

I, Figs. 2, 3, and 4, represents the shovel-standards; J, the shovels; and K, two seed-boxes, one on each side. In the bottom of the seed-boxes there is a slide, M, that is worked by a lever, L.

Having thus described the several parts of the machine, the practical operation will be explained as follows:

The shovels are numbered, of which there are eight, to describe more clearly their operation. The shovels 3, 4, 5, and 6 are for marking corn-ground. The side pieces, D D, to which the shovels 1 and 2 are attached, are connected to the front end of the center-piece H by a pin-joint. By means of this joint, and the slots $i$ in the cross-bar F, and the slots in the side pieces, E E, the shovels 1 and 2 may be set nearer or farther from each other, as the work may require. The shovels 3 4 are also used in connection with 1 2 for marking corn-ground. It will be well to state here that the ground is marked one way first with four shovels, 1, 2, 3, and 4, the cross-marking being done with two shovels only.

The seed-boxes before mentioned are constructed and operate as follows: In the bottom of each of the boxes at the center there is a hole. The slide M extends from one box to the other, as seen in Fig. 1, at each end of which are two holes, $n\ n$. These holes are of sufficient size to contain about four kernels of corn. As the slide is moved from one side to the other by the lever L the holes in the slide pass over the hole in the bottom of the box, and in thus passing over the corn drops through. To prevent more than the desired number of kernels from dropping through at one time a narrow board, $e$, is placed over the hole, under which the slide moves with the holes filled with corn until they come to the hole in the box, when the corn drops through.

The planting is done as follows: The driver sits upon the seat O, Fig. 1, his feet resting in the stirrup $p$, Fig. 4, in the rear of the machine. He holds in his left hand the lever L, the short arm of which connects with the slide M. The shovels 7 8 immediately in front of the boxes are now used, that make the cross-marking, opening the ground for the corn. As the machine moves forward and the boxes come over a mark first made the lever is either pushed forward or drawn toward the driver. If moved toward the driver it will bring the first hole in the end of the slide at the right hand and the second hole from the end at the left hand in direct relation with the holes in the bottom of the boxes, when the corn will drop through and fall on the ground. When the machine reaches the next mark previously made the reverse action of the lever produces a corresponding relation of the holes in the slide and boxes, and so on from one mark to another, alternating from right to left and from left to right.

The shovels 3, 4, 5, and 6 are used for cultivating corn. The front end of the cultivator, seeding-boxes, &c., is connected to the front of the hounds by a coupling, Q, (seen in Fig. 3.) The rear end is suspended by links $p\ p$, one of which is attached to a lever, S, and the other is connected to the lever $r$ by a shaft, $r'$, that has its bearings in boxes $r''$ on the frame. By means of this connection and the lever S the operator is enabled to raise or lower the shovels, as the nature of the work may require, and they are retained at any elevation by a ratchet-wheel, $j$, connected to the lever, and a catch, $j'$, causing the shovels to enter the ground a uniform depth. The cultivator, being hung by links in the manner described, enables the operator, while seated with his feet in the stirrups, to push the cultivator to or from the rows of corn, as the circumstances may require, a leverage being obtained by means of the seat. He can also cause the wheels to turn in a favorable direction, producing thereby a double movement. As the driver is seated in the rear of the machine his weight acts as a counter-balance, and the work all being before him, he is enabled to see while planting where the shovels strike the marks previously made, and can determine precisely when to drop the corn, or when cultivating the corn to tell how near to guide the shovels, and to govern the depth according to the nature of the ground.

Fig. 5 represents one of the shovel-standards detached, showing its construction. It is made of wood, curved, in the form represented, outward at the lower end, to which the shovel is attached, causing the shovel to be set out from the standard; or, instead of the lower end of the standard being curved out in this manner, the shovel or blade may be set out by means of a holder, $t$, (seen in Fig. 3,) attached to the standard.

$h$ is a brace, slotted at $a$, for the purpose of moving the shovel forward in order to give it more lifting power when desired, also to set it back to cause it to enter the ground deeper without lowering the whole frame. The shovel, being set out from the standard, as described, prevents the earth from clogging the blade and adhering to the standard, which is always the case when a staight standard is used.

What I claim as my improvement, and desire to secure by Letters Patent, is—

1. The arrangement of hanging the cultivator to the hounds C at Q, and, by links $p$, to the levers S $r$, in combination with the hounds, axle, and cultivator-frame, as and for the purposes set forth.

2. The adjustable arms D, cross-brace F, and pieces E E, for extending and contracting the frame, in combination with the seeding apparatus, lever L, and seat O, arranged as and for the purpose described.

J. L. FOUNTAIN.

Witnesses:
F. H. MAXWELL,
FRANK ALDEN.